United States Patent [19]
Schoenfelder

[11] Patent Number: 5,925,431
[45] Date of Patent: *Jul. 20, 1999

[54] LABEL WITH INTEGRATED CODING

[75] Inventor: Helmut Schoenfelder, Unterdarching/Valley, Germany

[73] Assignee: Zweckform Etikettiertechnik GmbH, Holzkirchen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/496,479

[22] Filed: Jun. 29, 1995

[30] Foreign Application Priority Data

Jun. 29, 1994 [DE] Germany .......... 94 10 522 U
Jun. 13, 1995 [EP] European Pat. Off. ...... 95109141

[51] Int. Cl.$^6$ ............................................. G09F 3/02
[52] U.S. Cl. .......... 428/40.1; 396/207; 396/208; 428/40.2; 428/40.9; 428/41.1; 428/41.2; 428/42.1; 428/138; 428/213
[58] Field of Search ............... 428/40.1, 40.2, 428/40.9, 41.1, 41.2, 41.7, 41.8, 42.1, 138, 213, 344, 345, 354; 396/207, 208

[56] References Cited

U.S. PATENT DOCUMENTS 4,918,471  4/1990  Harling et al. ................. 354/21

FOREIGN PATENT DOCUMENTS

| 0 143 755 | 6/1985 | European Pat. Off. . |
| 34 21 440 | 12/1984 | Germany . |
| 88 07 296 | 12/1988 | Germany . |
| 39 39 575 | 6/1991 | Germany . |
| 2 240 081 | 7/1991 | United Kingdom . |

OTHER PUBLICATIONS

Anonymous "Film Cartridge" Research Disclosure, May 1984, No. 241, No. 24156.

*Primary Examiner*—Nasser Ahmad
*Attorney, Agent, or Firm*—Nikaido, Marmelstein, Murray & Oram LLP

[57] ABSTRACT

Adhesive label for an article to be labeled, in particular for a film cartridge, the adhesive label coding machine-readable properties of the article, in particular of a film in the film cartridge, by the position of at least one boundary between an electrically conductive layer and an electrically nonconductive layer lying thereover, wherein the conductive layer is covered by a further conductive, in particular oxidation-inhibiting, protective layer.

69 Claims, 6 Drawing Sheets

LABEL WITH INTEGRATED CODING

BACKGROUND OF THE INVENTION

The invention relates to an adhesive label for an article to be labeled, in particular for a film cartridge (for example 35 mm film) for cameras, the adhesive label coding machine-readably properties of the article, in particular of a film in the film cartridge, by the position of at least one boundary between an electrically conductive layer and an electrically nonconductive layer lying thereover. The coding may be a so-called CAS ("Camera Auto Sensing") coding, which contains information on the photographic film contained— film speed, film length and exposure tolerance.

The coding takes place by defined arrangement of electrically conducting and nonconducting fields or their common boundaries at a fixed point on the film cartridge, the electrically conducting fields being interconnected electrically conductively. The items of information are scanned by an electrically active system—comprising two rows of contacts in the camera housing. In this case, current is introduced via one contact each per row, and then, depending on the field scanned (conductive or nonconductive), a current flow can be detected or not detected via the contacts following in the row. The respective combination of current-carrying contacts then provides the corresponding information, which is processed by the camera.

Until now, the cartridge sleeves have been printed on directly. The CAS coding is in this case achieved by the conductivity of the sleeve material, which is covered by electrically insulating printing inks at the points which are not to be conducting, so that no current can flow at these points via the contacts of the CAS system when the cartridge is inserted into the camera.

In the case of a number of private brands, the cartridge sleeves are provided with a combination of direct printing and adhesive label, it not having been possible in any case so far for the CAS coding to be integrated in the label, but instead always having been realized by means of the direct printing.

In these cases, the labeling takes place each time after the assembly of the cartridges, so that the label as such can be perceived and distinct compromises have to be made with regard to design. In the case of this process, there is also the risk of the label and coding having different film types and consequently that mix-ups with serious consequences can occur.

The cartridges comprise the following components: cartridge sleeve, winding spindle, lid, base and sealing lips of felt at the film exit opening.

The cartridge sleeves are formed from a 0.3 mm thick, chromium-plated steel sheet. The printing onto the sheets takes place by offset printing or a combination of offset printing with screen printing, in any case a special, highly scratch-resistant, electrically nonconducting printing ink being printed repeatedly (at least twice) over itself in the region of the CAS coding.

The nonconducting printing ink, which insulates established CAS fields, must withstand unharmed the abrasive stress occurring in practice due to the contacts, since otherwise erroneous items of information are read out due to unintended current flow and the film is incorrectly exposed. The high ink layer thickness of the repeated overprinting of a special, highly scratch-resistant printing ink is consequently indispensable in the region of the CAS coding due to the necessity of achieving a high abrasion resistance.

As the next step, the punchings necessary for forming the film opening are carried out on the printed-on metal sheet and then the metal sheet is cut into strips suitable for the cartridge-assembly machine. The strips are delivered to the film manufacturer in this form. Alternatively, the punching out of the lips for the film opening and the cutting into strips does not take place until at the film manufacturer's.

There, the prefabricated sheet-metal strips are introduced from a stack into the assembly machine and, from the left and right, the sealing lips are fed in from a roll and adhesively bonded (in some cases the sealing lips are also already applied in advance in a separate operation). After cutting off an individual blank from the strip, this is bent into a sleeve and the cartridge is completed by inserting the winding spindle and flanging on base part and lid part.

The charging of the cartridges with the photographic film takes place either in a separate operation after completion of the cartridge or in combination with the insertion of the winding spindle.

Photographic films are offered in a large number of types, color negative films, black-and-white films, slide films, various film speeds, various film lengths, special fabrications for promotional purposes, private brands, etc. A range of over 100 types, up to 250, is therefore normal for a film manufacturer.

Involved with this is the logistical problem of having the correspondingly printed-on sheet-metal strips available for the individual types at the required time and in the required quantity. This means that an adequate quantity of the most popular types (normally about 20) has to be kept constantly in stock and less popular types have to be ordered in good time.

Since the sheet-metal blanks are heavy and voluminous, a large storage capacity is taken up, which causes high costs. If, on the other hand, stock-keeping is reduced to a minimum, flexibility automatically suffers as a result, since types not in stock have first to be procured.

When a label is used, metal sheet and printing are separated from each other, in that the printing and the forming of the boundary is applied completely to an adhesive label. Stock-keeping can be adapted to the capacity of the cartridge assembly, i.e. cut back to a minimum. In an ideal case, the storage of the cartridge material can be reduced to one type, that is the unprinted type, because the types are established only by the labeling. The storage of what is needed for the individual types can take place compactly—and consequently in a space-saving and cost-saving manner—in label rolls.

Since direct printing is no longer needed, there is no longer any necessity to work in the formats which are specified for this and laborious to handle, but instead the metal sheet can be fed directly to cartridge production as a continuous strip.

In further steps, replacement of the sheet-metal cartridges by prefabricated plastic cartridges is also conceivable, since it is no longer essential to use the conductivity of the cartridge material.

The labeling of the film cartridges makes it possible for the abrasion resistance to be achieved not only by the customary process of overprinting highly scratch-resistant special inks but also by an overlamination, or to be made unimportant as a functional criterion by partially applying a conductive layer only in the corresponding regions which are to be conductive.

As a result, labeling is associated with an enormous expansion in the possible forms of design, ranging up to high-quality halftone printing, whereby the label can be given an attractive and promotionally effective design, for example multicolored, high-gloss, with tone shading. The label can additionally be provided with an optically scannable bar code.

It has been attempted to stick over CAS codings already on film cartridges an adhesive label bearing a different coding in order to change the scanned film speed. These adhesive labels contain a single unprotected metal layer, exposed to corrosion, or a single, nonmetallic base layer, which is partially printed with sensitive and unprotected conductive ink. Such labels may be adequate for the occasional changing of the film speed, but are not reliable enough for standard use in the mass production of film cartridges.

SUMMARY OF THE INVENTION

One object of the invention is therefore to present a coding for a film cartridge which avoids the stated disadvantages.

To achieve the objects of the invention and in accordance with the purpose of the invention, as embodied and broadly described herein, an adhesive label for an article to be labeled comprises an electrically conductive layer; an electrically nonconductive layer lying thereover, and at least one boundary between the electrically conductive layer and the electrically nonconductive layer; wherein the conductive layer is covered by a further conductive protective layer, which inhibits oxidation of the conductive layer lying thereunder and itself either does not oxidize or the oxide of which does not impair or only minimally impairs the conductivity, and wherein the adhesive label codes machine-readable properties of the article, by the position of the at least one boundary.

In another preferred embodiment, an adhesive label for an article to be labeled comprises an electrically conductive layer; an electrically nonconductive layer lying thereover; and at least one boundary at a position between the electrically conductive layer and the electrically nonconductive layer; wherein the electrically conductive layer rests on a nonconductive base material; and wherein the adhesive label codes machine-readable properties of the article by the position of the at least one boundary.

In yet another preferred embodiment, an adhesive label for an article to be labeled comprises a base material; an electrically conductive subarea; an electrically nonconductive subarea; and at least one boundary, at a position between the electrically conductive subarea and the electrically nonconductive subarea, established by a border of a clearance penetrating the base material of the adhesive label; wherein the adhesive label is adapted to be coded machine-readably on its outer side for properties of the article by the position of the at least one boundary.

In still another preferred embodiment, an adhesive label for an article to be labeled comprises an electrically conductive subarea; an electrically nonconductive subarea; and at least one boundary at a position between the electrically conductive subarea and the electrically nonconductive subarea; wherein the adhesive label is covered by a nonconductive laminating film cleared in a region of the conductive subarea; and wherein the adhesive label is adapted to be coded machine-readably on its outer side for properties of the article by the position of the at least one boundary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

The invention is described below by using several exemplary embodiments with reference to the attached drawings.

DETAILED DESCRIPTION OF THE PREFERRED EMBODIMENTS

Figure 1:
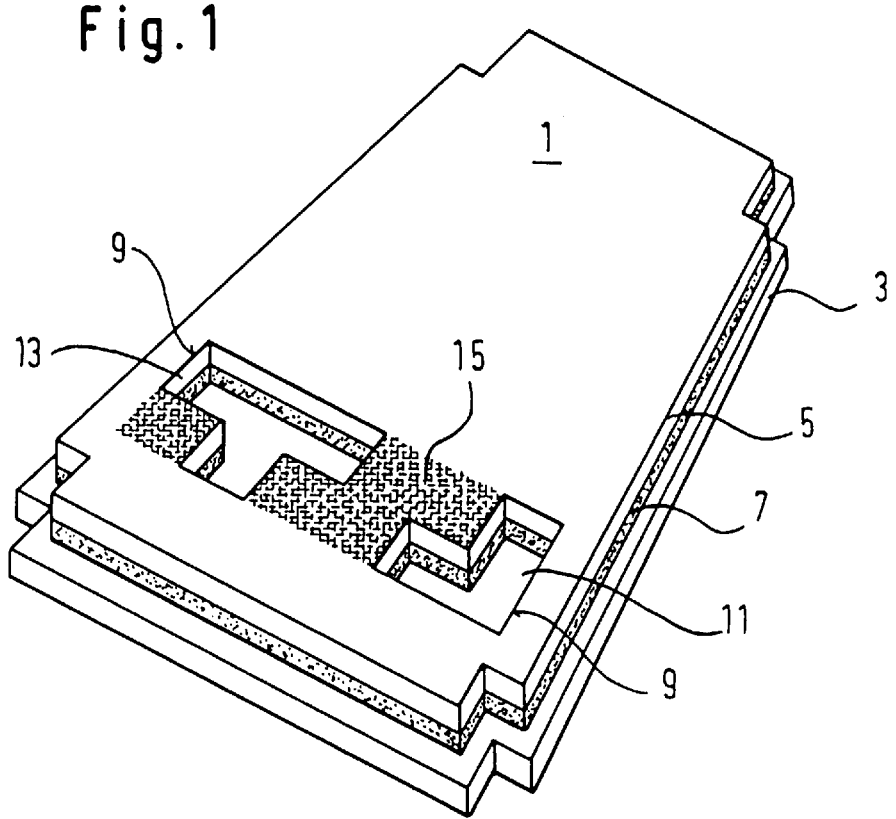
FIG. 1 shows a first configuration of the adhesive label on a blank for a film cartridge case.

One solution achieving the object of the invention consists in that the conductive layer is covered by a further conductive, in particular oxidation-inhibiting, protective layer. The protective layer is preferably designed in such a way that it inhibits the oxidation of the conductive layer lying thereunder and itself either does not oxidize or the oxide of which does not impair or only minimally impairs the conductivity. By this measure, any oxidation of the electrically conductive layer can be reliably prevented and, as a result, the scanning reliability of the coding can be increased. In addition, discolorations of the metal layer as the electrically conductive layer caused by oxidation, for instance verdigris in the case of a copper-containing metal layer, are avoided. Therefore, protective layers which inhibit oxidation of the conductive layer lying thereunder and themselves either do not oxidize or the oxide of which does not impair or only minimally impairs the conductivity or optics are used.

The protective layer may be vapor-deposited or sputtered, plated, electroplated or electrochemically applied in some other way to the conductive layer as a metallic layer. The vaporized metal may consist of aluminum or chromium. The sputtered-on coating may comprise gold, silver, chromium, stainless steel, titanium or indium-tin oxide alloy or electrically conductive plastic.

These layers may be applied very thinly and are—with respect to a conceivable use as a conductive base layer—reasonable with regard to costs. In addition, due to the conductive base layer lying thereunder, the resistance to mechanical stress is retained.

Vapor-deposited or sputtered aluminum has in comparison with rolled aluminum a different crystal structure and builds up a substantially thinner oxide layer, which only minimally impairs the conductivity.

Alternatively, the protective layer may be applied, in particular printed, onto the conductive layer in the form of a solvent-containing ink or such a lacquer. Suitable as the solvent-containing ink is such an ink with silver pigments, graphite pigments, nickel pigments and/or copper pigments as conductive constituents. Instead of a solvent-containing lacquer, which dries on by evaporation, a radiation-curing, in particular UV-radiation-curing, lacquer or such an ink is also suitable.

In addition, the protective layer may be applied by means of plating, electroplating or electrochemically.

The electrically conductive layer may rest on a nonconducting base material and form with the latter a composite, in particular of a soft or hard aluminum foil of a thickness of 8 to 30 $\mu$m with a biaxially oriented polypropylene or polyester film of a thickness of 12 to 60 $\mu$m. In this composite, the electrically conductive material may also comprise electrically conductive plastic, soft or hard copper foil or soft or hard foil of an alloy of copper and zinc, nickel, iron and/or beryllium of a thickness of 8 to 30 $\mu$m and a biaxially oriented polypropylene or polyester film of a thickness of 12 to 60 $\mu$m.

Such composite materials provide a reliably scannable and durable coding given a stable base material, so that in the case of standard use in the mass production of film cartridges there is no risk of deformation of the labels and the coding is reliably scannable during use.

The electrically conductive material may comprise a soft or hard aluminum foil of a thickness of 15 to 80 $\mu$m. Alternatively, the electrically conductive material may also comprise electrically conductive plastaic, soft or hard copper foil or soft or hard foil of an alloy of copper and zinc, nickel, iron and/or beryllium of a thickness of 15 to 80 $\mu$m.

The base material of the adhesive label may be formed from paper or plastic film. In the case of the plastic film, a thickness of 25 to 120 $\mu$m is preferred, in the case of biaxially oriented polyester film a thickness of 35 to 70 $\mu$m. In the case of a composite, the base material may comprise at least two layers of paper and plastic film or two plastic films of a total thickness of 20 to 120 $\mu$m, in particular two films of biaxially oriented polyester of a total thickness of 35 to 70 $\mu$m. The base material of paper preferably has an area-related mass of 40 to 150 g/m$^2$, in particular 60 to 80 g/m$^2$.

A low-cost alternative for the base material is a biaxially stretched polypropylene film which is foamed or provided with pinholes and has a thickness of 35 to 60 $\mu$m.

For protection against damage, the electrically nonconductive layer is preferably covered at least partially by a nonconductive laminating film cleared in the region of the conductive layer free from the nonconductive layer. A lamination, ideally with biaxially oriented polypropylene film, gives rise to the advantage that a very thin base material, preferably polypropylene film which is foamed or provided with pinholes, of a thickness of 35 to 50 $\mu$m, can be used and part of the deformation energy is taken up by the flexible connection between the films. In the case of a polypropylene film which is foamed or provided with pinholes and is of the abovementioned thickness as the base material, the lamination ensures the flexural rigidity required for processing. This configuration is particularly inexpensive.

The adhesive label, in particular its base material, preferably has an electrically nonconducting outer surface, a surface area of the adhesive label corresponding to an electrically conducting subarea being cleared. In this case, only the nonconducting subarea is formed by the adhesive label, while the conducting subarea is formed by the film cartridge to be labeled, in particular in the case of a film cartridge made from metal sheet. The common boundary between the conducting and nonconducting subareas, which forms the coding by its position, results from the position of the border of the clearance, while the unlabeled film cartridge itself may have a surface which is conductive throughout and consequently it can be used universally for various film types.

Alternatively, the adhesive label may have an electrically nonconducting outer surface, a surface area of the adhesive label corresponding to an electrically conductive subarea bearing an electrically conducting coating. In the case of this variant, the conducting and nonconducting subareas and their common boundary are formed by the adhesive label, so that a possible conductivity of the film cartridge material is no longer crucial.

The electrically conducting coating may be printed on or be applied from electrically conductive embossing foil, in particular hot-embossing foil.

If the adhesive label bears at least two mutually separate conductive subareas which are connected to each other by a web of electrically conductive material, this web is preferably subsequently covered in an insulating manner in order that the at least two electrically conductive subareas are not detected as a continuous area. The insulating covering of the web can be achieved by simple printing on of a nonconducting ink or by a nonconducting laminating film which is cleared only in the region of the conductive subareas and covers the web in an insulating manner. The webs may run such that they cannot touch the contacts of the camera and thus the abrasion resistance of the nonconducting ink is only of little significance.

Alternatively, the adhesive label, in particular its base material, may have an electrically conductive outer surface, a surface area of the adhesive label corresponding to an electrically nonconductive subarea bearing an electrically nonconductive coating. The base material of the adhesive label itself preferably comprises electrically conductive material, in particular aluminum-laminated paper or plastic of a thickness up to 70 $\mu$m. Preferably, the nonconductive coating is then printed on or formed by a laminating film of nonconductive material which has clearances in the region of the conductive subareas.

The labeling preferably takes place directly before the cutting off of the individual blanks from a sheet-metal strip and the sleeve formation in the assembly unit, that is to say on the still flat-lying sheet-metal strips. As a result, the label may be designed such that the upper and lower label borders disappear under the lid and base flanges and thus the label is not immediately recognizable as such.

This presupposes that the label material can take up without any adverse effects the deformation energy produced in the following processing steps. During the forming, the tensile stress occurring in the label material may cause the reorientation or rupture of the label material. The forces occurring may also have the effect of the borders of the labels lifting off and distortions in the label material or printed image.

Therefore, label materials and printing inks which are adequately flexible to take up the deformation energy without destruction and at the same time have a low proportion of reversible deformation are used. The preconditions are met by thinnest possible flexibly laminated composites of biaxially oriented polyester films, and aluminum-laminated paper. With regard to the printing inks, systems which remain flexible, such as gravure printing and conventional screen printing, are to be preferred.

Alternatively, there is the possibility of labeling the finished cartridges, the label then not disappearing under the flanges of lid and base and consequently remaining optically visible as a label. The deformation stress, on the other hand, is reduced to a minimum in the case of this process.

The application of the labels ideally takes place automatically from a roll—finished with a contact adhesive and arranged on a backing strip. This form of application allows high machine feeds and at the same time close tolerances with regard to positioning.

It goes without saying that this development can also be used in the case of other, identically or similarly constructed code systems whose coding areas have different physical properties, for example colors, thicknesses or the like. The invention is also applicable in the case of objects other than film cartridges.

A multiplicity of adhesive labels according to the invention can be arranged on a common backing strip, for automatic application by an adhesive-label dispenser.

For producing a film cartridge provided with a label according to the invention, one may apply a strip of label material to a sheet-metal strip moved in its longitudinal direction and then cut the sheet-metal strip, together with the label strip adhering thereupon, into individual blanks for the formation in each case of a film cartridge sleeve.

Alternatively, one may apply a multiplicity of separate labels one after the other to a sheet-metal strip moved in its longitudinal direction and then cut the sheet-metal strip between the labels adhering on it into individual blanks for the formation in each case of a film cartridge sleeve.

For labeling finished cartridges, the separate labels adhering on a common backing strip are brought up to the upper part of the film exit opening and then the trailing part of the label is rolled onto the cartridge by rotation of said cartridge and by a roller pressing against the latter.

This permits the processing of the metal sheet as continuous strips, which are very much easier to handle than the previously used large sheet-metal plates.

Preferred production processes for adhesive labels of the type mentioned at the beginning are discussed below.

In the case of the configuration shown in FIG. 1, a so-called CAS coding, which contains information on the photographic film contained in the film cartridge formed later—film speed, film length and exposure tolerance—, is integrated in an adhesive label which uses an electrically nonconducting label material. The electric conductivity of the sleeve material comprising sheet metal is used by cutting out and removing the label material at the points at which there are to be electrically conducting fields.

Figure 1A:
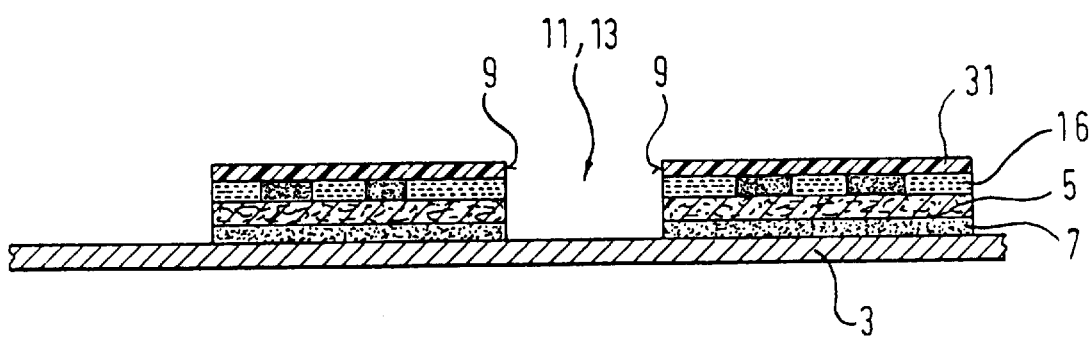
FIG. 1a shows a diagrammatic section through the adhesive label of the first configuration.

FIGS. 1 and 1a show such an adhesive label 1, which adheres on a substrate 3, that is a sheet-steel blank, from which a film cartridge sleeve is later produced. The adhesive label 1 comprises an electrically nonconducting base layer 5, which is provided on its underside with a contact adhesive 7. The base layer 5 bears an imprint 16, which in turn may be protected by a nonconducting laminating film 31. Along boundaries 9, determining the CAS coding by their position and arrangement, two subareas 11, 13 are punched out from the label 1 and the laminating film 31. Between the two punched-out subareas 11, 13 there is a nonconducting subarea 15. After this carrier label has been stuck onto the sheet-steel substrate 3, the coding is obtained, provided by the electrically conductive subareas 11, 13, which are electrically connected to each other by the sheet-steel material, and the electrically nonconducting subareas 15 of the adhesive label. The coding can be scanned by a multiplicity of electrical contacts of a camera, into which the film cartridge is inserted. Depending on the position of the boundary 9, the electrical contacts are in contact with the electrically conductive subareas 11, 13 or the nonconducting subarea 15, so that electric current can flow via the electrical contacts and the substrate 3, which connects the electrically conductive subareas 11, 13 electrically conductively to each other, while no electric current can flow in the region of the nonconducting subarea 15 due to the insulating effect of the label base material 5. The camera can automatically detect with its contacts, on the basis of the position of the boundary shared by the subareas of different electric conductivity, the film speed, film length and the exposure tolerance of the film contained in the cartridge.

The base material 5 consists of paper with an area-related mass of 40 to 150 g/m$^2$, in particular an area-related mass of 60 to 80 g/m$^2$.

Alternatively, the base material 5 comprises a plastic film with a thickness of 20 to 120 μm, in particular a biaxially oriented polypropylene film with a thickness of 50 to 70 μm.

Alternatively, the label material may also comprise a biaxially stretched, foamed polypropylene film of a thickness between 35 and 60 μm, which is additionally covered by the nonconducting laminating film 31, in particular a biaxially oriented polypropylene film. The lamination lends the label the flexural rigidity required for its processing.

In a second configuration, the integration of the CAS coding into the adhesive label relies on using an electrically nonconductive label material and realizing the coding by partial printing of electrically conductive inks or an electrically conductive embossing and nonconductive inks.

Figure 2:
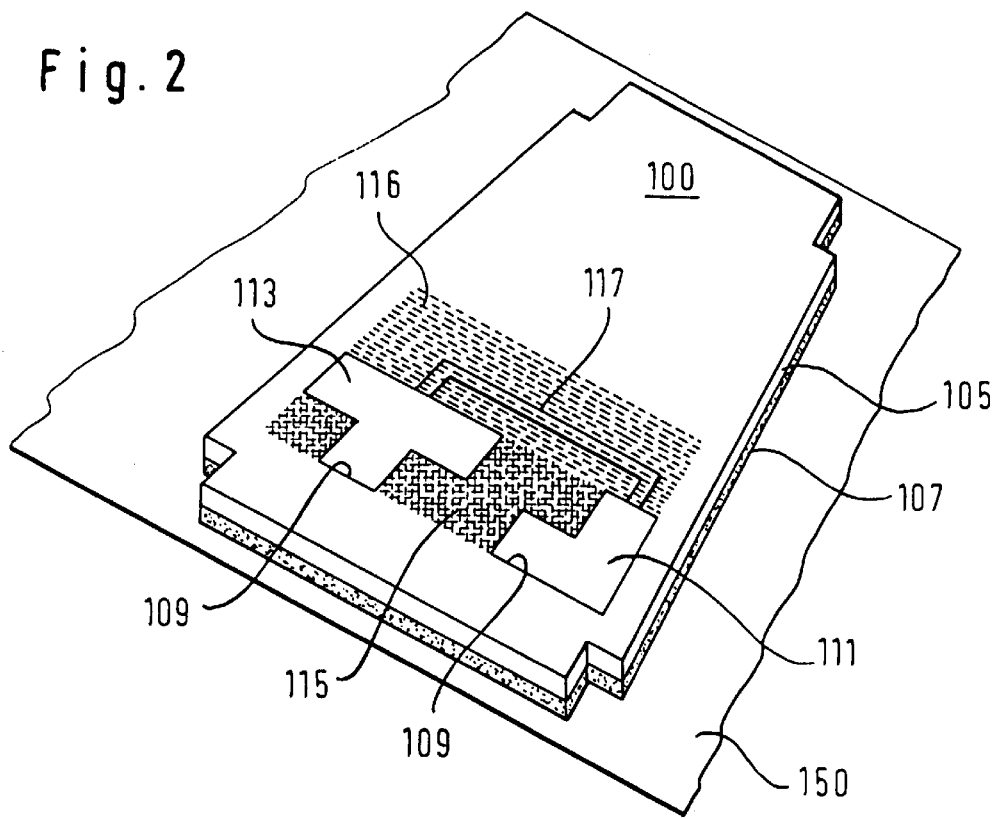
FIG. 2 shows a second configuration of the adhesive label on a backing strip.
Figure 2A:
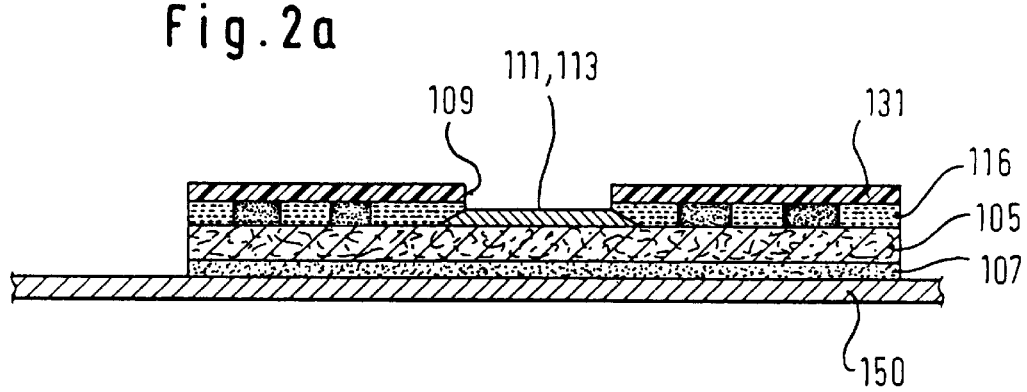
FIG. 2a shows a diagrammatic section through the adhesive label of the second configuration.

FIGS. 2 and 2a show such an adhesive label 100, which adheres on a backing strip 150 for automatic application by an adhesive-label dispenser. The adhesive label 100 comprises an electrically nonconducting base layer 105, which is provided on its underside with a contact-adhesive layer 107. Along boundaries 109, determining the CAS coding by their position and arrangement, two electrically conductive subareas 111, 113 are delimited from each other. Between the two electrically conductive subareas 111, 113 there is a nonconducting subarea 115. The electrically conductive subareas 111, 113 are printed onto the nonconducting base material 105 with electrically conductive ink or are embossed on with electrically conductive embossing foil, in particular hot-embossing foil. The conductive subareas 111, 113, geometrically separated from each other by the nonconducting subarea 115, are connected to each other by an electrically conductive web 117, which was applied to the base material in one operation with the conductive subareas 111, 113. The web 117 is covered in an insulating manner by an electrically nonconducting printing ink and/or lacquer 116. The nonconducting subarea 115 located between the conductive subareas 111, 113 is either unprinted or printed with electrically nonconducting inks or lacquers 116. The imprint 116 may be protected by a nonconducting laminating film 131 which is removed, for instance punched through, in the region of the conductive subareas 111, 113. Those contacts of the camera which touch the conductive subareas 111, 113 are in electrical connection with one another within a single conductive subarea, and, through the web 117, with the respectively other conductive subarea, while contacts located on the electrically nonconducting subarea 115 are insulated from the other contacts, from which the camera can read information for the film contained in the cartridge. The base material 105 consists of paper with an area-related mass of 40 to 150 g/m$^2$, in particular an area-related mass of 50 to 80 g/m$^2$.

Alternatively, the base material 105 comprises a plastic film of a thickness of 20 to 120 μm, in particular a biaxially oriented polypropylene film of a thickness of 50 to 70 μm.

Also suitable for use as the base material 105 is a biaxially stretched, foamed polypropylene film of a thickness between 35 and 60 μm, which is additionally covered with the nonconducting laminating film 113, in particular a biaxially oriented polypropylene film. The laminating film 113 lends the label the flexural rigidity required for its processing.

According to a third configuration, the integration of the CAS coding into the adhesive label relies on using electrically conductive base material and utilizing the electric conductivity of the base material to the extent that the base material is not printed on by insulating lacquer or inks at the points at which the electrically conductive subareas are to be, while the remaining surface areas of the label are printed on with electrically nonconducting ink or lacquering.

Figure 3:
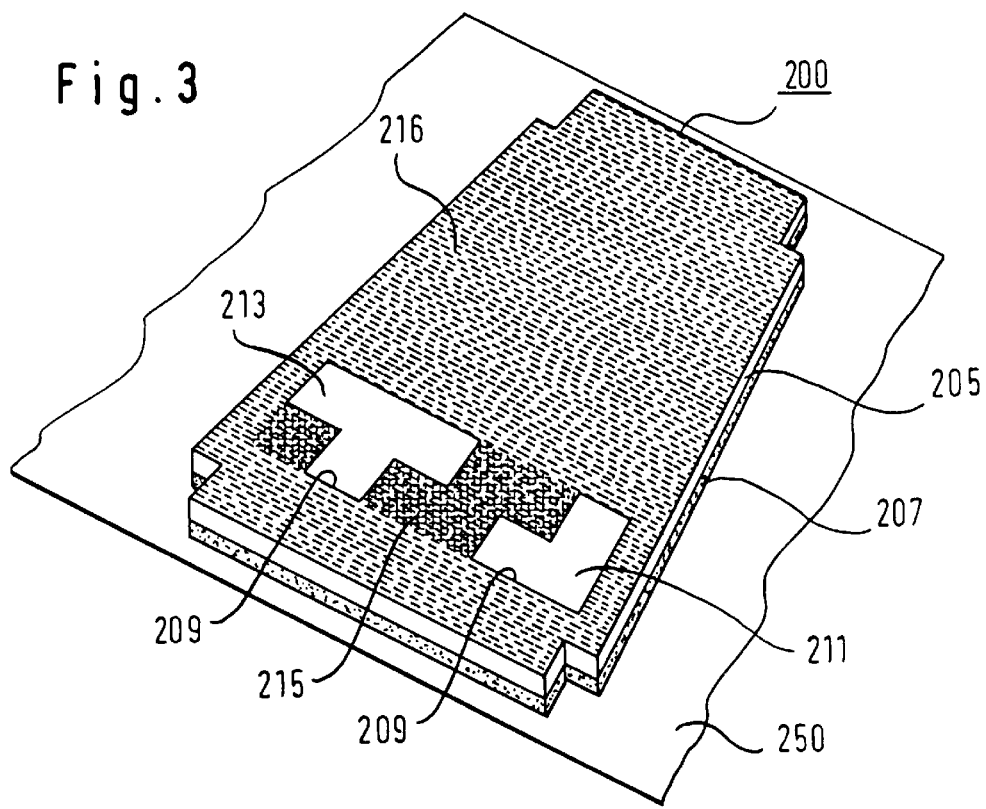
FIG. 3 shows a third configuration of the adhesive label on a backing strip.
Figure 3A:
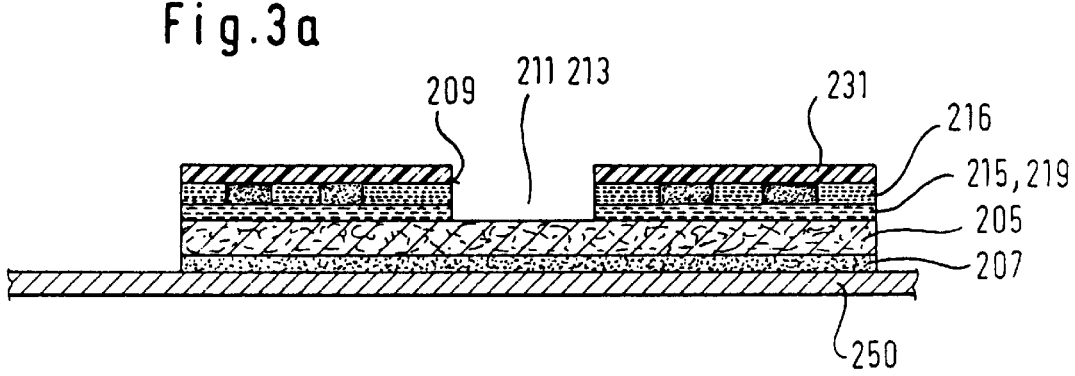
FIG. 3a shows a diagrammatic section through the adhesive label of the third configuration.

FIGS. 3 and 3a show such an adhesive label 200, which adheres on a backing strip 250 for automatic application by an adhesive-label dispenser. The adhesive label 200 comprises an electrically conductive base layer 205, which is provided on its underside with a contact adhesive 207. The base material 205 is covered on its outer surface by electrically nonconducting lacquers and/or printing inks 216, apart from the electrically conductive subareas 211, 213, on which there is no nonconducting lacquer 216. In the case of this configuration, the boundary 209, determining a coding by its position and arrangement, is established by the application of the electrically nonconducting lacquer 216. Between the two conductive subareas 211, 213 there is a nonconducting subarea 215, which is likewise formed from electrically nonconducting lacquer or nonconducting printing ink. The electrical contacts of the camera are partially in contact with one another through the base material 205 or, depending on the position of the boundaries 209, are insulated from one another by the electrically nonconducting lacquer layer 219, 215, which results in the coding effect.

The printed label may be additionally covered by a nonconducting laminating film 231, the laminating film 231 being punched-out in the region of the electrically conducting subareas 211, 213.

The following come into consideration as conductive base materials 205: metal foil, for example bare copper foil, bare aluminum foil, copper foil or aluminum foil with tin, lead/tin or nickel coating or conductive protective lacquering; paper or plastic film which is laminated over its full surface area or partially with one of the above metal foils; film of electrically conductive plastic; composite of paper or plastic film with a film of electrically conductive plastic and metalized paper or plastic film.

The conductive base material 205 preferably comprises aluminum-laminated paper or plastic film of a maximum thickness of 70 μm.

Figure 4:
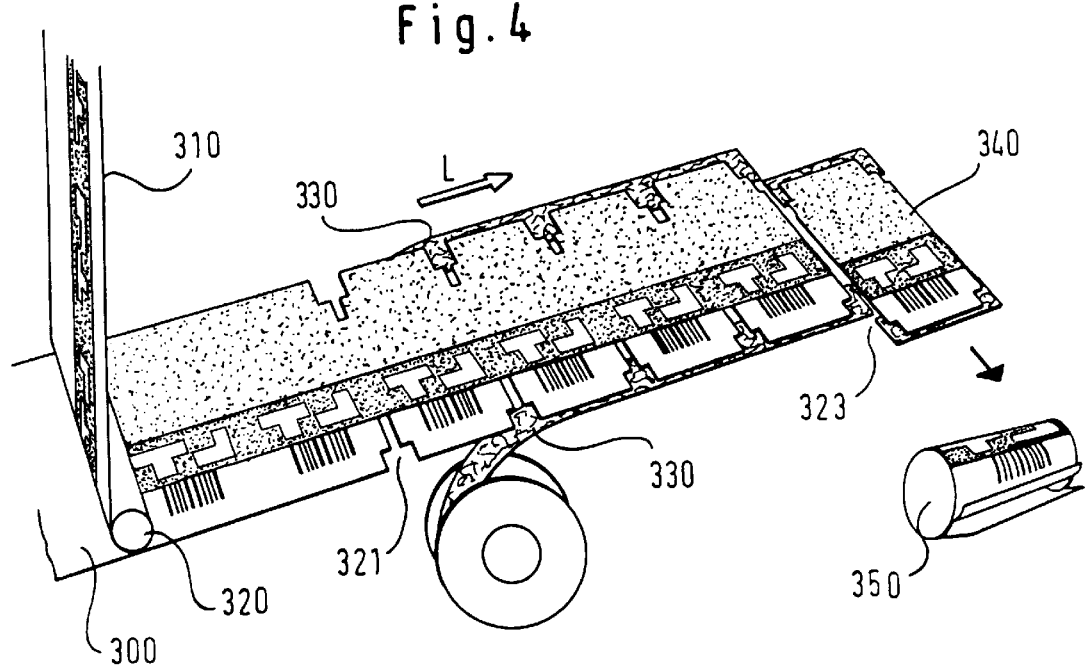
FIG. 4 shows an arrangement for applying a continuous adhesive strip on a sheet-metal strip for the production of film cartridge sleeves.

FIG. 4 diagrammatically shows an arrangement for the labeling of film cartridges. A continuous strip 310 of label material is stuck by means of a laminating roller 320 on a continuous sheet-metal strip 300 moved in its longitudinal direction L. Subsequently, later border regions are punched out at 321 for the formation of a film exit opening of the finished film cartridge. In a next station, sealing felt strips 330 are stuck on along both longitudinal borders of the underside, not adhered to by the label strip 310, of the sheet-metal strip 300. The sealing felts later form a light and dust guard of the film exit opening of the finished film cartridge. Only now, at 323, is the sheet-metal strip 300, together with the label strip 310 and the sealing felts 330 adhering on it, cut transversely to the running direction L into a multiplicity of blanks 340, to form the latter only now into a film cartridge sleeve 350.

Figure 5:
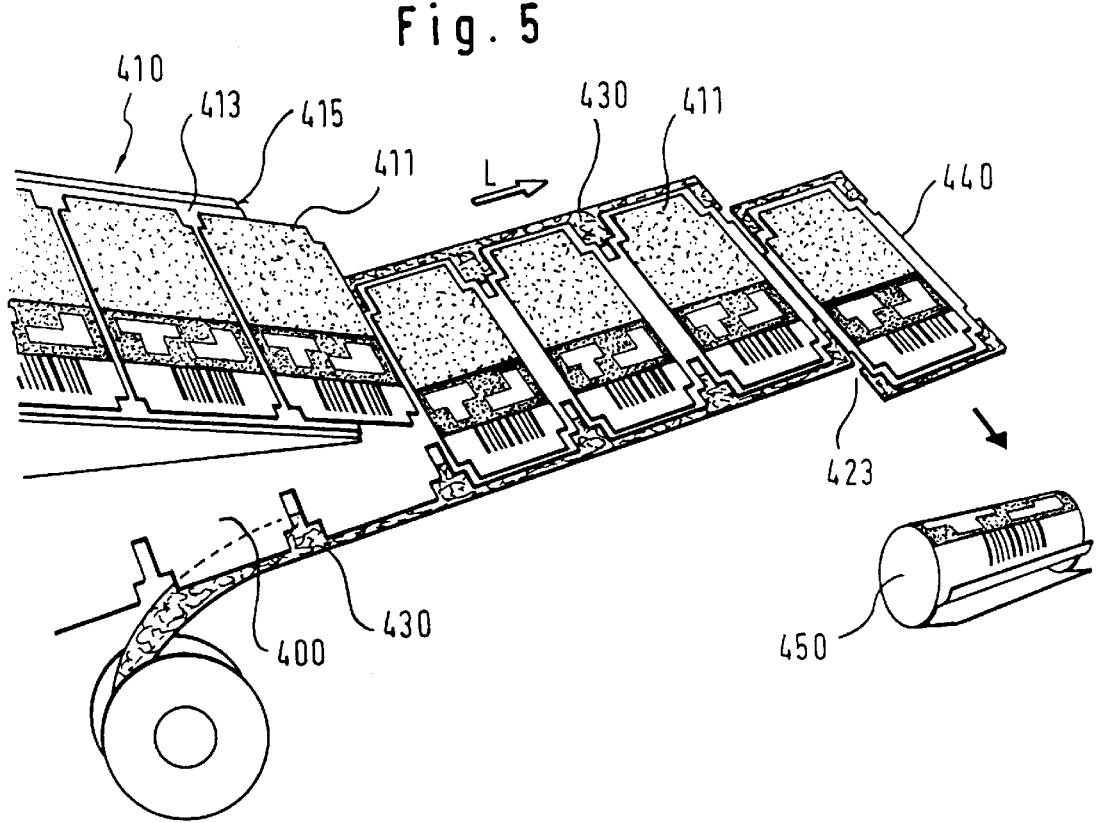
FIG. 5 shows another arrangement for transferring individual labels, adhering on a common backing strip, onto a sheet-metal strip for the production of film cartridge sleeves.

FIG. 5 shows another arrangement of the film cartridge labeling. Here, a sheet-steel strip 400, moved in its longitudinal direction L, is labeled with the aid of an automatic label dispenser 410, known per se, with a multiplicity of individual labels 411 already separated from one another in advance. As in the case of the configuration according to FIG. 4, the sheet-steel strip 400 has sealing felt strips 430 adhered to it on its side not to be labeled, along its longitudinal borders. The labels 411, fed in from the label dispenser 410, are located before their transfer onto the sheet-metal strip 400 on a common backing strip 413, which is formed from paper, polyester film or polypropylene film which is finished, for example with a single-sided silicone coating, such that it repels the contact adhesive of the label. The backing strip 413 is drawn around a dispensing edge 415 of the label dispenser 410, the labels 411 detaching themselves from the backing strip 413 and being transferred onto said sheet-metal strip. Subsequently, at 423, the sheet-metal strip 400 is cut through, together with the sealing felts 430, between the labels 411 applied at intervals, transversely to the running direction L, so that a multiplicity of ready-labeled sheet-metal sections 440 are obtained, which are subsequently formed in each case into a film cartridge sleeve 450.

Figure 6:
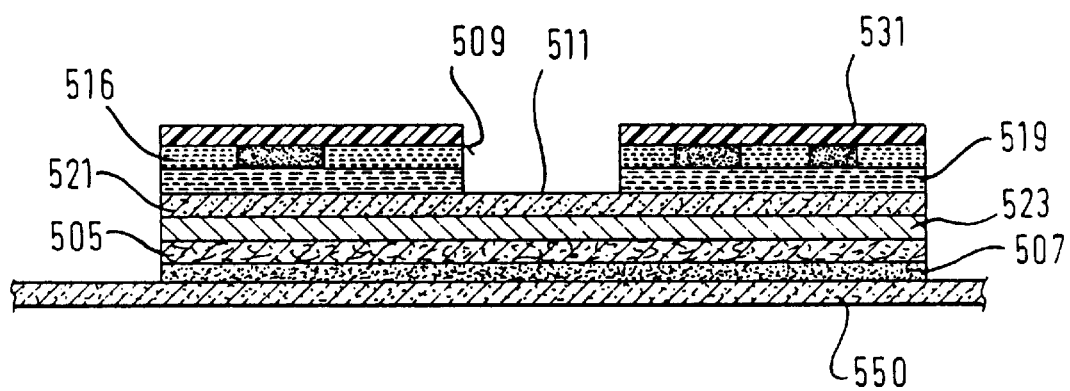
FIG. 6 shows a diagrammatic section through an adhesive label of a fourth configuration.

FIG. 6 shows in diagrammatic section a fourth configuration of the adhesive label. A base layer 505 of nonconducting material, for instance plastic film or paper, is coated on the underside with contact adhesive 507 and adheres on a siliconized backing strip 550. On the upper side, the base layer 505 is provided with a conductive layer 523 and forms with the base layer 505 a composite. It comprises electrically conductive plastic, aluminum foil, unrefined aluminum foil, copper-containing foil with zinc, nickel, iron and/or beryllium-alloyed copper foil of a thickness of 80 to 30 μm. If the base layer 505 is absent, a somewhat thicker conductive layer of a thickness of 15 to 80 μm is used.

For protection against oxidation, which impairs a reproducible, reliable scanning of the coding and, under certain circumstances, would discolor, the conductive layer 523 is protected by an oxidation-inhibiting layer 521, in the form of a vaporized metal of aluminum or chromium or a sputtered-on coating of gold, silver, chromium, stainless steel, titanium or indium-tin oxide alloy or electrically conductive plastic. Also possible is a solvent-containing lacquer or a radiation-curing, for instance UV-curing, lacquer with silver pigments, graphite pigments, nickel pigments or copper pigments as conductive constituents.

Similarly to the configuration of FIG. 3a, the conductive protective layer 521 is covered by an insulating layer 519, which is cleared in the region of the conductive subarea 511 and in turn bears an imprint 516. The imprint 516 is protected by a nonconductive laminating film 531, which is cleared in the region of the conductive subarea 511. The boundary separating conductive and nonconductive subareas, which establishes the coding, is denoted by 509.

Figure 7:
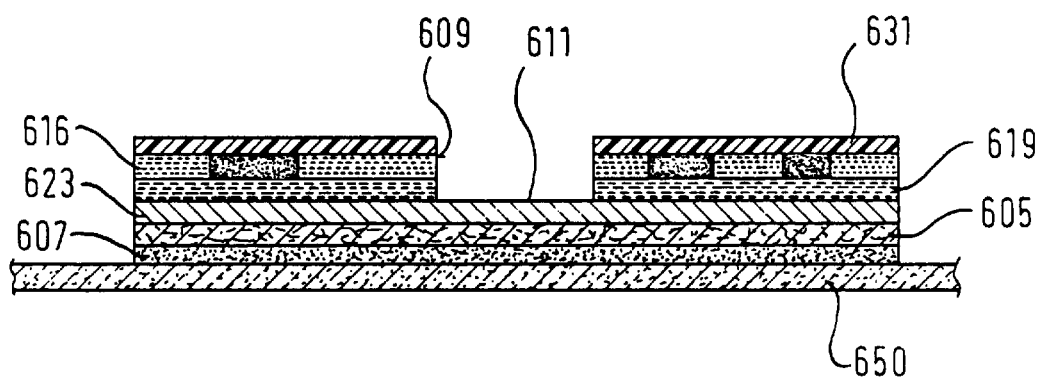
FIG. 7 shows a diagrammatic section through an adhesive label of a fifth configuration.

FIG. 7 shows in diagrammatic section a fifth configuration of the adhesive label similar to FIG. 6, but without a protective layer. Here, the electrically conductive layer 623 comprises electically conductive plastic, aluminum, gold, silver, stainless steel, titanium, indium-tin oxide alloy or copper with anticorrosive properties. The layer structure and the materials used correspond to the configuration of FIG. 6, corresponding layers being provided with reference numbers increased by 100.

Figure 8:
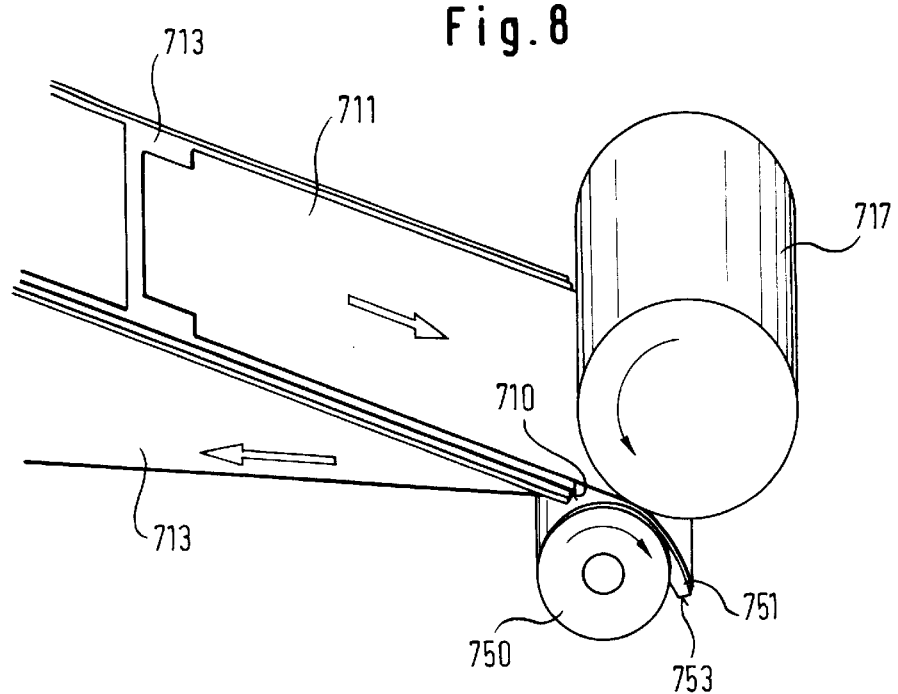
FIG. 8 shows an arrangement for transferring an adhesive label onto a film cartridge sleeve.

FIG. 8 shows an arrangement for the transfer of adhesive labels 711, adhering separately in the longitudinal direction on a backing strip 713, onto the peripheral surface area of a film cartridge sleeve 750. The backing strip 713 is drawn around a fixed dispensing edge 710, the adhesive label 711 detaching itself from the backing strip 713. The adhesive label 711 is pressed with its leading end by means of a pressure roller 717 against a radially protruding border 751 of the film cartridge sleeve 750, turning with its film exit opening 753 ahead. The film cartridge 750 is located with respect to the adhesive label 711 on the same side as the backing strip 713. In the course of the further rotation, the adhesive label 711 is transferred onto the periphery of the film cartridge 750.

Figure 9:
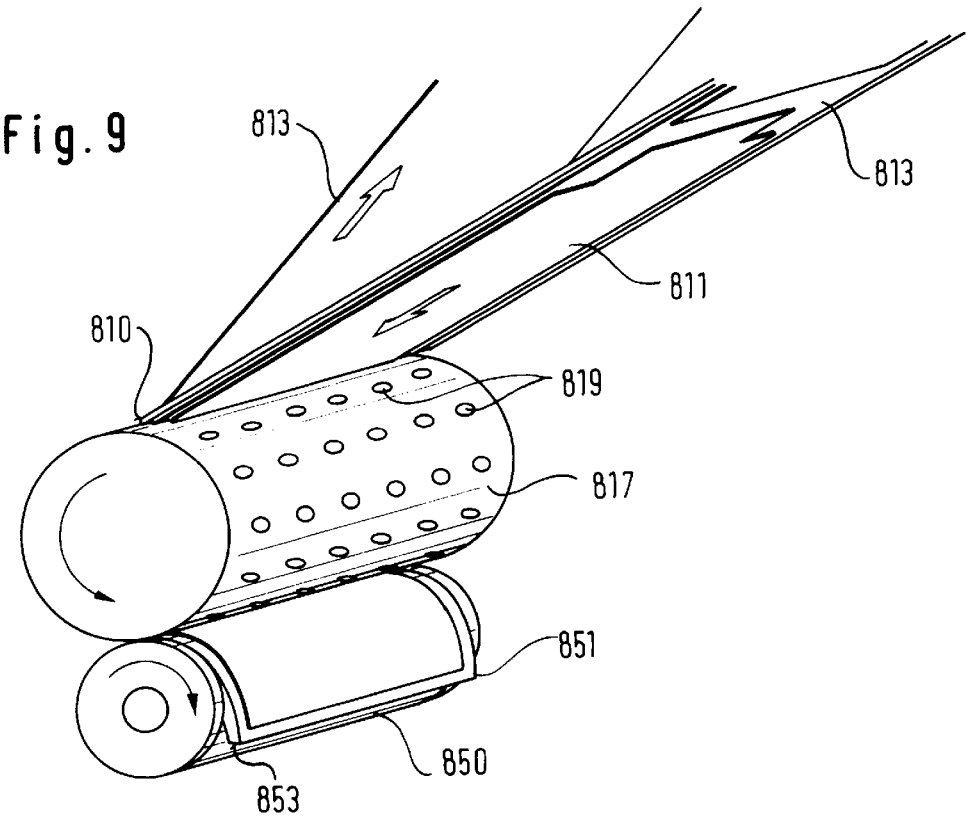
FIG. 9 shows a further arrangement for transferring an adhesive label onto a film cartridge sleeve.

FIG. 9 shows another possibility of transferring an adhesive label 811, adhering separately in the longitudinal direction on a backing strip 813, onto the peripheral surface area of a film cartridge sleeve 850. The backing strip 813 is drawn around a fixed dispensing edge 810, the adhesive label 811 detaching itself from the backing strip 813 and being transferred onto a suction drum 817. The suction drum 817 contains in its peripheral surface area suction holes 819, which are connected to a reduced-pressure source, and is located on the side of the adhesive label 811 opposite from the backing strip 813. From the rotating suction drum 817, the adhesive label 811, facing with its side bearing contact adhesive outward, is transferred onto the film cartridge 850. The adhesive label 811 is pressed with its leading end first against a radially protruding border 851 of the film cartridge sleeve 850, turning with its film exit opening 853 ahead, and in the course of the further rotation is transferred onto the periphery of the film cartridge sleeve 850.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An adhesive label for an article to be labeled, comprising:
   an adhesive layer for adhering the label to the article to be labeled;
   an electrically conductive layer disposed over the adhesive layer;
   an electrically conductive protective layer covering a side of the electrically conductive layer remote from the adhesive layer to inhibit oxidation of the electrically conductive layer;
   an electrically nonconductive layer lying over the electrically conductive protective layer; and
   at least one boundary defining a subarea of the electrically conductive layer and the electrically conductive protective layer that is free of the electrically nonconductive layer;
   wherein the electrically conductive protective layer either does not oxidize or the oxide of which does not impair or only minimally impairs the conductivity; and
   wherein the adhesive label codes machine-readable properties of the article, by the position of the at least one boundary.

2. The adhesive label of claim 1, wherein the article comprises a film cartridge and wherein the machine-readable properties include properties of a film in the film cartridge.

3. The adhesive label as claimed in claim 1, wherein the protective layer is composed of one of vapor-deposited, sputtered, plated, electroplated, or electrochemically applied onto the electrically conductive layer.

4. The adhesive label as claimed in claim 1, wherein the protective layer comprises a solvent-containing ink or lacquer applied onto the electrically conductive layer.

5. The adhesive label of claim 4 wherein the protective layer is printed onto the electrically conductive layer.

6. The adhesive label as claimed in claim 1, wherein the protective layer comprises a radiation-curing ink or lacquer applied onto the electrically conductive layer.

7. The adhesive label of claim 6, wherein the protective layer comprises a UV-radiation-curing ink or lacquer.

8. The adhesive label of claim 7, wherein the protective layer is printed onto the electrically conductive layer.

9. The adhesive label as claimed in claim 1, further comprising a nonconductive base material between the adhesive layer and the electrically conductive layer, wherein the base material and the electrically conductive layer form a composite.

10. The adhesive label as claimed in claim 1, wherein the electrically conductive layer comprises a material selected from the group consisting of aluminum foil, unrefined aluminum foil, copper foil, and copper foil alloyed with zinc, nickel, iron and/or beryllium, having a thickness of 8 to 30 μm.

11. The adhesive label of claim 10, wherein the electrically conductive layer comprises a single-ply material having a thickness of 15 to 30 μm.

12. The adhesive label as claimed in claim 1, wherein the electrically conductive layer comprises a vapor-deposited or sputtered, electrically conductive layer selected from the group consisting of aluminum, chromium, gold, silver, stainless steel, titanium, indium-tin oxide, and copper.

13. The adhesive label of claim 1, wherein the article comprises a film cartridge and the machine-readable properties include properties of a film in the film cartridge.

14. The adhesive label as claimed in claim 1, wherein the electrically conductive layer comprises a copper-containing foil.

15. The adhesive label of claim 14, wherein the electrically conductive layer comprises unrefined aluminum foil.

16. An adhesive label for an article to be labeled, comprising:
   an adhesive layer for adhering the label to the article to be labeled;
   an electrically conductive layer disposed over the adhesive layer;
   an electrically nonconductive layer lying over the electrically conductive layer;

at least one boundary defining a subarea of the electrically conductive layer that is free of the electrically nonconductive layer; and a nonconductive laminating film covering the electrically nonconductive layer and avoiding a region of the electrically conductive layer that is free of the electrically nonconductive layer;

wherein the adhesive label codes machine-readable properties of the article by the position of the at least one boundary.

17. The adhesive label as claimed in claim 16, wherein the electrically conductive layer comprises an electrically conductive plastic.

18. The adhesive label as claimed in claim 9, wherein the nonconductive base material comprises at least one of paper and a plastic film.

19. The adhesive label as claimed in claim 9, wherein the nonconductive base material comprises paper having an area-related mass of 40 to 150 g/m².

20. The adhesive label of claim 19, wherein the area-related mass ranges from 60 to 80 g/m².

21. The adhesive label as claimed in claim 9, wherein the nonconductive base material comprises plastic film of a thickness of 20 to 120 µm.

22. The adhesive label of claim 21, wherein the plastic film comprises biaxially oriented polypropylene film having a thickness of 50 to 70 µm.

23. The adhesive label as claimed in claim 9, wherein the nonconductive base material comprises a foamed, biaxially stretched polypropylene film with a thickness of 35 to 60 µm.

24. The adhesive label as claimed in claim 9, wherein the adhesive layer comprises contact adhesive on a side of the nonconductive base material remote from the electrically conductive layer and the electrically nonconductive layer.

25. The adhesive label as claimed in claim 1, further comprising, separate from the electrically conductive layer and the electrically nonconductive layer, areas on an upper surface of the label for product information or bar codes that can be read by a user.

26. A backing strip provided with a multiplicity of adhesive labels as claimed in claim 24, for automatic application by an adhesive-label dispenser.

27. The backing strip as claimed in claim 26, wherein the backing strip comprises paper, polyester film, or polypropylene film and has a siliconized finish such that it repels the contact adhesive.

28. A film cartridge having an adhesive label as claimed in claim 1.

29. The adhesive label as claimed in claim 1, wherein the electrically conductive layer comprises a material selected from aluminum foil, unrefined aluminum foil, copper foil, and copper foil alloyed with zinc, nickel, iron and/or beryllium, having a thickness of 8 to 80 µm.

30. The adhesive label as claimed in claim 16, wherein the nonconductive laminating film protects an imprint and comprises a biaxially oriented polypropylene film.

31. An adhesive label in combination with an article to be labeled, comprising:

an adhesive layer adhering the label to the article to be labeled;

a base material disposed on the adhesive layer;

at least one of an electrically conductive subarea and an electrically nonconductive subarea disposed on the base material, the label containing one of the electrically conductive subarea and the electrically nonconductive subarea, the article containing the other of the electrically conductive subarea and the electrically nonconductive subarea; and at least one boundary between the electrically conductive subarea and the electrically nonconductive subarea, the at least one boundary defined by a border of an opening penetrating the base material of the adhesive label;

wherein the adhesive label is adapted to be coded machine-readably on its outer side for properties of the article by the position of the at least one boundary.

32. The adhesive label of claim 31, wherein the article comprises a film cartridge, and the properties include the properties of a film in the film cartridge.

33. The adhesive label as claimed in claim 31, wherein the article to be labeled includes the electrically conductive subarea, the base material of the adhesive label has an electrically nonconductive outer surface, and the opening bounds the electrically conductive subarea.

34. The adhesive label as claimed in claim 31, wherein the opening is punched out.

35. The adhesive label as claimed in claim 31, further comprising:

a nonconductive laminating film on the base material, wherein the opening completely penetrates the base material and the nonconductive laminating film.

36. The adhesive label as claimed in claim 31, wherein the adhesive layer comprises a contact-adhesive layer on the base material, wherein the opening completely penetrates the base material and the contact-adhesive layer.

37. The adhesive label as claimed in claim 35, wherein the nonconductive laminating film protects an imprint and comprises a biaxially oriented polypropylene film.

38. The adhesive label as claimed in claim 31, further comprising, separate from the electrically conductive subarea and the electrically nonconductive subarea, areas on an upper surface of the label for product information or bar codes which can be read by a user.

39. A film cartridge having an adhesive label as claimed in claim 31.

40. The adhesive label as claimed in claim 18, wherein the base material comprises a composite of a paper layer with at least one plastic film to compensate for stresses caused by the labeling on a curved article, the composite having a total thickness of 25 to 120 µm.

41. The adhesive label as claimed in claim 18, wherein the base material comprises a composite of two plastic films which are flexibly joined to each other to compensate for stresses caused by the labeling on a curved article, the composite having a total thickness of 25 to 120 µm.

42. An adhesive label for an article to be labeled, comprising:

an adhesive layer for adhering the label to the article to be labeled;

at least two mutually separate, electrically conductive subareas disposed on the adhesive layer, the electrically conductive subareas connected to each other by a web of electrically conductive material;

an insulating covering that covers the web;

an electrically nonconductive subarea disposed on the adhesive layer and separating the at least two electrically conductive subareas; and at least one boundary between the electrically conductive subareas and the electrically nonconductive subarea, wherein a perimeter of the electrically conductive subareas substantially extend along the boundary between the electrically conductive subareas and the electrically nonconductive subarea; and a nonconductive laminating film covering the label except in the region of the electrically conductive subareas;

wherein the adhesive label is adapted to be coded machine-readably on its outer side for properties of the article by the position of the at least one boundary.

43. The adhesive label of claim 42, wherein the article comprises a film cartridge, and the properties are properties of a film in the film cartridge.

44. The adhesive label as claimed in claim 42, further comprising a base material between the electrically conductive subareas and the adhesive layer, wherein the base material has an electrically nonconductive outer surface.

45. The adhesive label of claim 44, wherein the base material comprises a nonconductive material.

46. The adhesive label as claimed in claim 42, wherein an upper surface of the electrically conductive subareas has an electrically conductive coating.

47. The adhesive label of claim 46, wherein the electrically conductive coating is one of printed on or applied from an electrically conductive embossing foil.

48. The adhesive label of claim 47 wherein the electrically conductive coating is applied from an electrically conductive hot-embossing foil.

49. The adhesive label as claimed in claim 42, wherein the nonconductive laminating film protects an imprint and comprises a biaxially oriented polypropylene film.

50. The adhesive label as claimed in claim 42, further comprising an electrically conductive base material disposed between the adhesive layer and the electrically nonconductive subarea, wherein the base material has an electrically conductive outer surface.

51. The adhesive label of claim 50, wherein the base material comprises aluminum-laminated paper or plastic having a thickness up to 70 $\mu$m.

52. The adhesive label as claimed in claim 42, further comprising a printed-on, electrically nonconductive coating applied to a surface remote from the adhesive layer of the electrically nonconductive subarea.

53. The adhesive label as claimed in claim 42, wherein at least one of the electrically conductive subareas is surrounded by the electrically nonconductive subarea.

54. The adhesive label as claimed in claim 42, wherein a base material is disposed on the adhesive layer and comprises at least one of paper and a plastic film.

55. The adhesive label as claimed in claim 1, and further comprising, separate from the electrically conductive layer and the electrically nonconductive layer, areas on an upper surface of the label for product information or bar codes that can be read by a user.

56. A film cartridge having an adhesive label as claimed in claim 42.

57. The adhesive label as claimed in claim 54, wherein the base material comprises a composite of a paper layer with at least one plastic film to compensate for stresses caused by the labeling on a curved article, the composite having a total thickness of 25 to 120 $\mu$m.

58. The adhesive label as claimed in claim 54, wherein the base material comprises a composite of two plastic films which are flexibly joined to each other to compensate for stresses caused by the labeling on a curved article, the composite having a total thickness of 25 to 120 $\mu$m.

59. An adhesive label for labeling an article having an electrically conductive subarea, said adhesive label comprising;

an adhesive layer for adhering the label to the article to be labeled;

a base material disposed on the adhesive layer; and an electrically nonconductive subarea disposed on the base material;

wherein the adhesive label defines at least one boundary between the electrically conductive subarea and the electrically nonconductive subarea by a border of an opening penetrating the base material of the adhesive label;

wherein the adhesive label is adapted to be coded machine-readably on its outer side for properties of the article by the position of the at least one boundary.

60. An adhesive label for labeling an article having an electrically non-conductive subarea, said adhesive label comprising:

an adhesive layer for adhering the label to the article to be labeled;

a base material disposed on the adhesive layer; and an electrically conductive subarea disposed on the base material;

wherein the adhesive label defines at least one boundary between the electrically conductive subarea and the electrically nonconductive subarea by a border of an opening penetrating the base material of the adhesive label;

wherein the adhesive label is adapted to be coded machine-readably on its outer side for properties of the article by the position of the at least one boundary.

61. The adhesive label of claim 1, wherein the electrically conductive layer comprises a material selected from chromium, gold, silver, stainless steel, titanium, indium-tin oxide, and copper and is vapor-deposited or sputtered onto the base material.

62. The adhesive label of claim 1, wherein the conductive layer is formed from a copper containing foil having a thickness of 8 to 80 $\mu$m.

63. The adhesive label of claim 1, wherein the electrically conductive layer comprises a material selected from copper foil and foil of copper alloyed with at least one of zinc, nickel, iron and beryllium, having a thickness of 8 to 80 $\mu$m.

64. The adhesive label of claim 1, further comprising, separate from the electrically conductive and nonconductive layers, surface areas for product codes or bar codes which can be optically read by a user.

65. An adhesive label for an article to be labelled, comprising:

an adhesive layer for adhering the label to the article to be labelled;

a base material;

an electrically conductive layer on the base material in a vapor-deposited or sputtered form supported by the base material, the electrically conductive layer being selected from the group consisting of aluminum, chromium, gold, silver, stainless steel, titanium, indium-tin oxide, and copper;

an electrically nonconductive layer lying over the electrically conductive layer; and at least one boundary defining a subarea of the electrically conductive layer not covered by the electrically nonconductive layer;

wherein the adhesive label codes machine-readable properties of the article by the position of the at least one boundary.

66. An adhesive label for an article to be labelled, comprising:

an adhesive layer for adhering the label to the article to be labelled;

an electrically conductive layer disposed over the adhesive layer, wherein the electrically conductive layer is formed from aluminum foil or a copper-containing foil having a thickness of 8 to 30 µm;

an electrically nonconductive layer lying over the electrically conductive layer; and at least one boundary defining a subarea of the electrically conductive layer not covered by the electrically nonconductive layer;

wherein the adhesive label codes machine-readable properties of the article by the position of the at least one boundary.

67. An adhesive label for an article to be labelled, comprising:

an adhesive layer for adhering the label to the article to be labelled;

an electrically conductive layer disposed over the adhesive layer, the electrically conductive layer being selected from the group consisting of copper foil and copper foil alloyed with zinc, nickel, iron and/or beryllium, having a thickness of 8 to 30 µm;

an electrically nonconductive layer lying over the electrically conductive layer; and at least one boundary defining a subarea of the electrically conductive layer not covered by the electrically nonconductive layer;

wherein the adhesive label codes machine-readable properties of the article by the position of the at least one boundary.

68. An adhesive label for an article to be labelled, comprising:

an adhesive layer for adhering the label to the article to be labelled;

an electrically conductive layer disposed over the adhesive layer;

an electrically nonconductive layer lying over the electrically conductive layer;

at least one boundary defining a subarea of the electrically conductive layer not covered by the electrically nonconductive layer; and separate from the electrically conductive layer and the electrically nonconductive layer, areas on an upper surface of the label for visible product information or visible bar codes;

wherein the adhesive label codes machine-readable properties of the article by the position of the at least one boundary.

69. An adhesive label for an article to be labelled, comprising:

an adhesive layer for adhering the label to the article to be labelled;

an electrically conductive subarea;

an electrically nonconductive subarea;

at least one boundary between the electrically conductive subarea and the electrically nonconductive subarea; and separate from the electrically conductive subarea and the electrically nonconductive subarea, areas on an upper surface of the label for visible product information or visible bar codes;

wherein the adhesive label is adapted to be coded machine-readably on its outer side for properties of the article by the position of the at least one boundary.

* * * * *